(No Model.)
E. P. CURTISS.
AXLE BOX.
No. 322,584. Patented July 21, 1885.
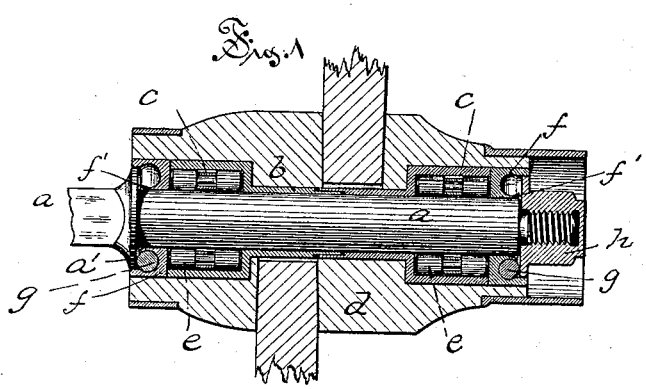
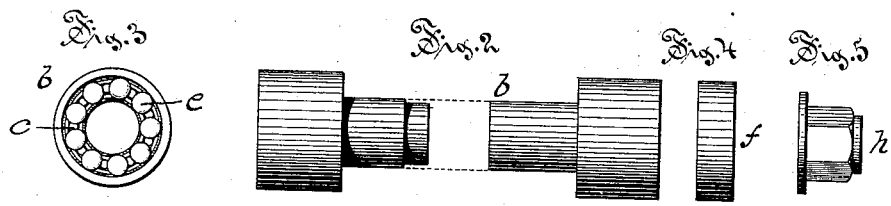
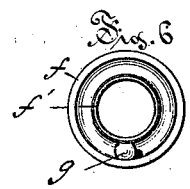
Witnesses:
W. M. Bjorkman
A. P. Williams
Inventor:
Everett P. Curtiss,
By Simonds & Burdett,
attys.

UNITED STATES PATENT OFFICE.

EVERETT P. CURTISS, OF HARTFORD, CONNECTICUT.

AXLE-BOX.

SPECIFICATION forming part of Letters Patent No. 322,584, dated July 21, 1885.

Application filed May 25, 1885. (No model.)

*To all whom it may concern:*

Be it known that I, EVERETT P. CURTISS, of Hartford, in the county of Hartford and State of Connecticut, have invented certain new and useful Improvements in Axle-Boxes, of which the following is a description, reference being had to the accompanying drawings, where—

Figure 1 is a view in central longitudinal section of a hub and box embodying my invention and attached to an axle-arm. Fig. 2 is a detail side view of one form of my improved partible axle-box, shown as pulled apart to better illustrate the construction. Fig. 3 is an end view of the axle-box and a contained anti-friction bearing. Fig. 4 is a side view of the annular washer adapted to close the open end of the socket in the axle-arm. Fig. 5 is a side view of the flanged nut. Fig. 6 is a plan view of the recessed end of the annular washer with ball-bearings located in the recess.

The object of my invention is to provide an axle-box for use on vehicles of all descriptions, which box is particularly adapted for use with so-called anti-friction bearings; and my improvement consists in a partible axle-box, having on each end outward opening sockets adapted for the reception of such anti-friction bearings, and in certain other details of the hub and box, as more particularly hereinafter described.

In the accompanying drawings, the letter *a* denotes an axle-arm of ordinary material and construction, preferably cylindrical in outline, with its outer end shouldered and threaded for the reception of a nut and its inner end terminating in a flanged shoulder. *b* denotes one form of my improved partible axle-box, which is cylindrical in outline, and bears upon each end the enlarged outward-opening sockets *c*. These enlargements of the axle-box are borne upon separate parts of the box, so that the respective parts may be inserted in the hub *d* from opposite ends thereof. This point of junction is preferably midway of the box, the respective parts being connected by halving them together, as illustrated, and slipping the end of one part within the other until the shoulders on the enlargements come to a bearing against the opposite faces of the hub; or they may be fastened by means of a thread cut on the smaller part and fitting a threaded socket in the larger part, the particular method of joining the parts not being material to my invention.

In the outward-opening sockets *c* in the enlargements on the opposite ends of the box is placed an annular ring bearing a series of anti-friction rollers, preferably of the kind shown and described in Letters Patent of the United States to O. R. Chaplain, dated April 10, 1877, No. 189,427. Any other form of anti-friction bearing, however, may be fitted and used within the sockets in the ends of the axle-box. The inner diameter of this set of anti-friction bearings *e* is less than the inner diameter of the box, so that none of the rolling friction comes upon the inside of the box except in those parts where the anti-friction bearings are interposed between the axle-arm and the box—that is, in the sockets in the enlarged ends of the latter. Each of these sockets *c* in my form of axle-box, herein described, is of such diameter and so shaped that the inner end wall forms a shoulder that limits the endwise play of the anti-friction bearings that are located within such sockets.

Between the shoulder $a'$ on the axle-arm and the inner end of the axle-box is inserted an annular metallic washer, *f*, the face of which next to the shoulder is grooved to receive one or more balls, *g*, which are held in the groove by turning slightly downward the edge of the flange $f'$, which forms the inner wall of the groove next to the axle-arm, and such ball or balls project far enough beyond the face of the annular washer to bear against the shoulder on the axle-arm.

A similar annular washer is located between the open end of the socket on the outer end of the axle-box and the flange on the nut *h*, this nut being adapted to fit the threaded end of the axle-arm, and when screwed home to hold the respective washers against the box ends and the shoulder on the axle-arm, so that there shall be no end play of the parts.

In using the form of my improvement shown in the drawings the hub is first bored and counter-bored to form a socket for the axle-box, which is inserted in place from opposite ends of the hub, and it is then ready for the reception of the anti-friction bearings and for mounting on the axle-arm, with the parts in position, substantially as described.

I claim as my invention—

1. As a new article of manufacture, a partible axle-box having on each end outward-opening sockets, which are larger in diameter than the central opening through the axle-box and form chambers adapted to contain anti-friction rollers, all substantially as described.

2. In combination, a partible axle-box having on each end outward-opening sockets, anti-friction bearings fitted in said sockets with their inner diameter less than the inner diameter of the axle-box, and an axle-arm, all substantially as described.

EVERETT P. CURTISS.

Witnesses:
CHAS. L. BURDETT,
H. R. WILLIAMS.